Patented Dec. 3, 1935

2,023,270

UNITED STATES PATENT OFFICE 2,023,270

SPONGE RUBBER SHEET MATERIAL HAVING BROKEN CELLS, SAID CELLS BEING FILLED WITH FERTILIZER, INSECTICIDES, OR PLASTIC FILLERS

Albert C. Fischer, Chicago, Ill.

No Drawing. Application February 28, 1935, Serial No. 8,716

15 Claims. (Cl. 47—1)

This invention relates to a sponge rubber sheet material having broken cells, said cells being filled with fertilizer or insecticides. The said sheet, free from said filling material, may be used as a moisture storage means about plants or as a fertilizing or mulching means.

Heretofore it has been customary to dissolve the fertilizer in water or otherwise spread the same over the soil, allowing water to carry it into the soil.

My invention relates to a storage means for this fertilizing material so that its use will be gradual and extended over a period of time.

My invention relates to a sponge rubber sheet material which may be formed from various types of rubber, such as a new gum rubber, a mixture of new gum rubber and reclaimed rubber or other rubber containing a filling material, said rubber containing cells in a broken state.

My invention relates to filling these cells with a fertilizer material which may be accomplished by dissolving the fertilizer or incorporating same in a liquid, preferably water. This liquid is taken up by the sponge rubber sheet and then treated so that the fertilizer remains in the cells and the liquid evaporates. This material is then placed in the soil adjacent to the roots of plants, whereupon moisture as it penetrates the soil releases a certain proportion of the fertilizer from the cells.

Instead of fertilizer I may use insecticides of various types in the same manner for the destruction of pests. Where insecticides are used I may use the sponge rubber sheet as a tree band in addition to its use as a fertilizing means. Also, I may make flower pots out of this material, preparing the outside of the flower pot with an outer skin of unbroken cells and the inside of the pot with broken cells and without a skin surface. Then I may fill the cells with the fertilizing means or insecticide by treating same, so as to retain same in place so that when the roots of the plant approach the sides of the flower pots the fertilizer or insecticide will be available. This sponge rubber material may be simply buried in the ground as a retainer of moisture and placed near the surface so that when moisture is available the cells will be penerated and the moisture retained instead of passing readily through the ground. The moisture will then be given off gradually for the benefit of the plant adjacent to which it is placed.

Another feature of my invention comprises a sponge rubber sheet which may be formed from any suitable rubber composition and made porous, the porous condition preferably being large broken pores. Said composition may contain filling material, the filling material being fibrous, mineral or vegetable, formed into a cellular structure, said cells being filled with a plastic material, such as, "Tree Tanglefoot," or any other suitable plastic substance resembling vasoline, pasty fillers, and in fact any type of filler which upon pressure would exude from the pores or cells of the sponge rubber container. I may use this material for agricultural purposes or any other purpose for which this method of exuding material may be satisfactory.

This material is preferably placed in the sponge rubber in a thin liquid condition and allowed to cool, or formed thereinto a plastic mass, flowable out of the pores under pressure. The material may thus be used for tree band purposes, or wherever it is desired to prevent insects crossing the sheet and where the surface is ready to be revived by further exudation upon pressure.

Likewise this may be accomplished with fertilizer or insecticides embodied in the plastic substance, so that pressure may gradually force out more or less of the contents contained in the sheet.

Many other suitable purposes may be found for such a sheet than those mentioned, but I wish particularly to mention four uses for this material, which are:—

1. As a fertilizing means.
2. As an insect destroying means.
3. As a moisture storing means.
4. As a storing means for plastic insecticides for plastic, flowable substances.

I also may use this material for mulching purposes, in which the mulch is prepared much the same as fertilizer and stored in the cells of the sponge rubber sheet. In any case the fertilizer, by one method or another, or the contents of the cells are available to the root growth of the plants, and the insecticide prevents the ground from being contaminated by pests. Storage of moisture keeps the plant properly moist. Where used as a mulching means the mulch is made available to the plant in a more continuous process of use.

When used as a mulch and moisture storage means or as an aerating means, a sponge rubber strip aids in preventing the soil from becoming sour and thus insures the continued life of the plant.

Having thus described my invention what I claim is:

1. A sponge rubber sheet or strip having broken cells contained therein, being adapted as a moisture storing means about plants.

2. A soft rubber strip or sheet comprising broken cells, said cells containing a fertilizing material adapted to be placed adjacent to the roots of plants that the same may become properly fertilized.

3. A sponge rubber strip or sheet comprising broken cells, said cells being filled with an insecticide adapted to be placed adjacent to plants or used as a filling material for crevices, etc., where pests or worms may thrive.

4. A sponge rubber strip comprising broken cells filled with a mulching material, said strip adapted to the placed about plants for their proper cultivation.

5. A sponge rubber strip containing broken cells adapted for use as a moisture spreading means to be placed about plants for the proper cultivation of same.

6. A pot adapted for use as a flower pot or receptacle for plants comprising a soft rubber material, having broken cells on the inner side, said cells being filled with a fertilizing material.

7. A pot adapted for use as a flower pot or receptacle for plants comprising a soft rubber material, having broken cells on the inner side, said cells being filled with an insecticide.

8. A pot adapted for use as a flower pot or receptacle for plants comprising a soft rubber material, having broken cells on the inner side, said cells being adapted for use as a moisture storing means.

9. A sponge rubber sheet having broken cells, said cells being filled with a soft filling material readily expelled from the cells upon pressure.

10. A tree band comprising a sponge rubber sheet having broken cells, said cells containing "Tree Tanglefoot".

11. A tree band comprising a sheet or band of sponge rubber having broken cells, said cells being filled with a sticky waterproofing semi-fluid.

12. A sponge rubber sheet material having broken cells in part or all of its area, said cells being filled with a soft semi-fluid material readily expelled upon pressure.

13. A storage means for plastic substances, comprising cellular sponge rubber, said cells being broken and having incorporated therein a plastic material in a fluid state, the sponge rubber sheet having porous cells, said cells being broken and filled with a semi-fluid material.

14. A cellular structure in which the walls of the cells are broken, said structure being resilient in character and said porous means being filled with a semi-fluid.

15. A porous compressible housing means in conjunction with a plastic, semi-fluid in which the filling material may be exuded upon pressure.

ALBERT C. FISCHER.